US012404677B2

(12) United States Patent
Meinster et al.

(10) Patent No.: US 12,404,677 B2
(45) Date of Patent: Sep. 2, 2025

(54) AWNING DEVICES

(71) Applicant: RENSON NV, Waregem (BE)

(72) Inventors: John Peter Meinster, Gentbrugge (BE); Steven Rita André Vanhoutte, Deerlijk (BE); Maxim Gustave Solomaniuck, Ouwegem (BE); Peter Marc Vansteelandt, Lauwe (BE)

(73) Assignee: RENSON NV, Waregem (BE)

( * ) Notice: Subject to any disclaimer, the term of this patent is extended or adjusted under 35 U.S.C. 154(b) by 495 days.

(21) Appl. No.: 17/793,686

(22) PCT Filed: May 11, 2021

(86) PCT No.: PCT/IB2021/054008
§ 371 (c)(1),
(2) Date: Jul. 19, 2022

(87) PCT Pub. No.: WO2021/245482
PCT Pub. Date: Dec. 9, 2021

(65) Prior Publication Data
US 2023/0065907 A1 Mar. 2, 2023

(30) Foreign Application Priority Data
Jun. 5, 2020 (BE) .................................. 2020/5400

(51) Int. Cl.
*E04F 10/06* (2006.01)
*H01R 12/70* (2011.01)
(Continued)

(52) U.S. Cl.
CPC ..... *E04F 10/0648* (2013.01); *H01R 12/7005* (2013.01); *H01R 12/75* (2013.01); *H01R 13/5219* (2013.01)

(58) Field of Classification Search
CPC . E04F 10/0648; H01R 12/7005; H01R 12/75; H01R 13/5219
(Continued)

(56) References Cited

U.S. PATENT DOCUMENTS 4,867,691 A * 9/1989 Eck ........................ H01R 12/58 439/82
4,891,017 A * 1/1990 Kuhn ................ H01R 13/6272 439/380
(Continued)

FOREIGN PATENT DOCUMENTS

CN 1734892 A 2/2006
EP 2354430 B1 1/2011
(Continued)

OTHER PUBLICATIONS

Belgian Search Report from corresponding Belgian Application No. BE202005400, Mar. 10, 2021.
(Continued)

*Primary Examiner* — Gary F Paumen
(74) *Attorney, Agent, or Firm* — Workman Nydegger

(57) ABSTRACT

An awning device includes a roll-up awning, an electric motor for rotating the roll-up awning, which motor is electrically supplied by one or more wires, a supply cable having one or more wires, an electrical coupling for coupling the wires of the supply cable to the wires of the motor, which coupling includes a male and female component which can be coupled together electrically and mechanically, wherein the male component has at least one contact pin and the female component comprises at least one contact socket.

19 Claims, 7 Drawing Sheets

(51) Int. Cl.
*H01R 12/75* (2011.01)
*H01R 13/52* (2006.01)

(58) Field of Classification Search
USPC ...... 439/924.1, 380, 296, 271, 76.1, 75, 936
See application file for complete search history.

(56) References Cited

U.S. PATENT DOCUMENTS

| | | | | |
|---|---|---|---|---|
| 4,911,645 | A * | 3/1990 | August | H01R 12/82 439/82 |
| 5,263,880 | A * | 11/1993 | Schwarz | H05K 5/0069 29/841 |
| 6,547,569 | B1 * | 4/2003 | Issaa | H01R 12/52 439/924.1 |
| 6,655,975 | B1 * | 12/2003 | Liedtke | H05K 5/064 439/910 |
| 7,438,576 | B2 * | 10/2008 | Sakakura | H05K 3/284 439/936 |
| 7,789,714 | B2 * | 9/2010 | Liu | H01R 12/58 439/924.1 |
| 9,397,419 | B2 * | 7/2016 | Kang | H01R 4/4821 |
| 9,806,450 | B2 * | 10/2017 | Liao | H01R 12/57 |
| 2006/0035491 | A1 | 2/2006 | Robin et al. | |
| 2015/0072545 | A1 | 3/2015 | Kang et al. | |
| 2016/0149363 | A1 | 5/2016 | Patel et al. | |
| 2016/0190742 | A1 * | 6/2016 | Jozwik | H01R 13/622 439/271 |
| 2017/0047682 | A1 | 2/2017 | Ho | |
| 2017/0271801 | A1 | 9/2017 | Liao | |

FOREIGN PATENT DOCUMENTS

| | | | |
|---|---|---|---|
| FR | 2775729 | A1 | 9/1999 |
| WO | 2006045724 | A1 | 5/2006 |

OTHER PUBLICATIONS

International Search Report from corresponding PCT Application No. PCT/IB2021/054008, Jun. 22, 2021.

* cited by examiner

AWNING DEVICES

TECHNICAL FIELD

The present invention concerns awning devices, more specifically awning devices with roll-up awning.

PRIOR ART

Awning devices comprising a roll-up awning are today often operable electrically, wherein the awning rolls up or unrolls by drive by an electric motor. This is often mounted in a steel shaft which carries the awning.

Mounting such awning devices is not easy. In rolled up state, including the supports and similar, and together with the coaxially mounted motor (the assembly being known as the canvas packet), the awning must be inserted in the housing suspended from the wall, for example a façade. In addition, the motor must be connected to the power supply, which may be either the network-voltage alternating current or a photovoltaically generated, low-voltage direct current. The motor often comprises the male or female component of a coupling piece which, during insertion of the canvas packet, must be connected to the other (male or female) component which is connected to the power supply. Such canvas packets may have a weight of up to around 80 kg, so careful handling is not easily possible.

Also, during the service life of these awning devices, the connectors must be manipulated. For example, if the canvas must be replaced or if the motor is faulty, often the entire canvas packet must be removed from the housing, wherein the male and female connection components are separated.

One example of suitable connectors is given in EP2354430B1. The disadvantage of these connectors is the fragility of the connection pins which may be damaged during manipulation of the components on the construction site before the canvas packet is inserted in the housing, or which bend during insertion of the canvas packet in the housing.

SUMMARY OF THE INVENTION

It is an object of the invention to provide awning devices with a roll-up awning, which devices are fitted with connectors able to resist the forces occurring during insertion of the canvas packet, with simultaneous coupling of the connectors during this action. It is a further object to provide connectors which are less fragile for handling on site.

According to a first aspect, an awning installation is provided. An awning device according to the first aspect comprises a roll-up awning, an electric motor for rotating the roll-up awning, which motor is electrically supplied by one or more wires, a supply cable comprising the one or more wires, an electrical coupling for coupling the wires of the supply cable to the wires of the motor, which coupling comprises a male and a female component which can be electrically and mechanically coupled together, wherein the male component comprises at least one contact pin and the female component comprises at least one contact socket, characterized in that the male component comprises a printed circuit board (PCB) on which the least one contact pin is electrically coupled to at least one printed conductor on the printed circuit board, which at least one printed conductor is electrically coupled to at least one wire of a first of the motor and supply cable, wherein the female component comprises a printed circuit board (PCB) on which the at least one contact socket is electrically coupled to at least one printed conductor on the printed circuit board, which at least one printed conductor is electrically coupled to at least one wire of the other of the motor and the supply cable. The male component comprises a housing which encloses the printed circuit board, and/or the female component comprises a housing which encloses the printed circuit board.

The wires are electrically conductive wires or cores, typically copper wires or cores, which conduct current, if necessary e.g. low-voltage direct current of 24 V or 48 V, or alternating current of 3 to 4 A and 230 V, from and to the motor.

The printed circuit boards comprise printed conductors on a board. The board is typically made of epoxy, for example glass fibre textile (e.g. fabric) reinforced epoxy, and has a thickness in the range from 1.0 to 2.0 mm, such as e.g. 1.6 mm.

The printed conductors are electrical conductors. The use of printed circuit boards for high-voltage alternating current imposes high demands, and requires preferably suitable dimensions. In order to be able to conduct sufficient current, certainly in the case of high current with high-voltage alternating current, the conductors have a weight per surface area of 0.5 to 3 ounces per square foot, such as between 1 and 2 ounces per square foot, inclusive. The cross-section is preferably equal to or greater than 0.106 $mm^2$, certainly for conductors with a surface area weight of 2 ounces per square foot.

The printed conductors are made of conductive materials, typically metals, and preferably of copper or copper alloys. The printed conductors may in some cases be coated with solder, nickel or gold, or may have undergone treatment with benzimidazolethiol to prevent corrosion. In some cases, the printed conductors have undergone a "conformal coating" to prevent corrosion, current leakage and/or reduced lifetime due to condensation. This may take place by dipping, spraying or vacuum deposition of silicon rubber, polyurethane, acrylic or epoxy.

The awning device typically furthermore comprises a device housing for accommodating the rotatable awning and motor.

According to some embodiments, the male component may comprise a housing which surrounds the printed circuit board.

According to some embodiments, the female component may comprise a housing which surrounds the printed circuit board.

Also, the contact pins and sockets remain accessible for creating the coupling between the male and female component.

The housing of the female connector may protrude past the contact sockets. The housing of the male connector may protrude past the contact pins.

According to some embodiments, each of the housings may comprise a shell which partially or fully provides the housing outside and surrounds the printed circuit board, wherein the printed circuit board in the shell is enclosed by a polymer volume which fills the shell.

The printed circuit board is thus completely enveloped with polymer. The printed circuit board is thus embedded in polymer.

The shell provides each housing with at least part of and preferably all the outer wall. This shell, which may consist of different parts, may be produced with very precise dimensions, e.g. by injection moulding of the whole or the parts of the shell. An electrical component, for example the printed circuit board housed in this shell, is thus surrounded by a wall, the thickness of which can be guaranteed very precisely. Thus a minimum distance between the outer wall of the housing and each of the components present in the shell can be guaranteed. The minimum thickness of the shell is preferably between 0.5 and 2 mm. A shell with a disruptive voltage of 31 kV/mm between the two sides of the wall is preferably provided. Measured according to EN60355, the insulation must comply with the base insulation of 1250V.

The polymer volume may be poured or cast into the shell, while the printed circuit board is positioned at the desired location inside the shell. Thus the printed circuit board may be completely encased and surrounded, so that none of the electrical components on the printed circuit board is situated outside the polymer volume, i.e. outside the housing. The polymer volume contacts the printed circuit board over its entire surface area. Also, the contact pins and contact sockets remain accessible to one another in order to be able to form electrical contact with one another.

Suitable polymers for the shell are all polymers suitable for accommodating electrical components, for example extrusion-compatible polymers such as thermoplastics and elastomers. Preferably, the wall thickness and polymer are selected so as to achieve a disruptive voltage of at least 600 V/mm, preferably more than 10 kV/mm, such as more than 30 kV/mm. Typical suitable polymers are polyamide (PA), polyester (PES), polyolefins such as polypropylene (PP), polyethylene (PE), polyethylene terephthalate (PET), polyvinylchloride (PVC) and similar or mixed polymers, in some cases supplemented with softeners, fire retardant agents, fillers and similar. More preferably, PA or PVC is used.

Suitable polymers for the polymer volume are all polymers suitable for contacting of electrical components, preferably injection-mouldable polymers such as thermoplastics and elastomers. For example, these polymers are polyamide (PA), polyester (PES), polyolefins such as polypropylene (PP), polyethylene (PE), polyethylene terephthalate (PET), polyvinylchloride (PVC) and similar or mixed polymers, in some cases supplemented with softeners, fire retardant agents, fillers and similar. More preferably, PA or PVC is used, preferably applied by injection moulding.

The polymer used for the shell and the polymer for the polymer volume must be complementary and adhere to one another.

According to other embodiments, the male and/or female component may comprise a housing which consists solely of a shell. The shell may consist of different parts which attach and adhere to one another by means of a closing system, for example by means of a click system. The printed circuit board is completely surrounded by the shell after mounting and attachment, e.g. click closure, of the different parts of the shell.

The shell or shell parts are preferably made of polymer, more specifically of injection-moulded polymer. An electrical component, for example the printed circuit board housed in this shell, is thus surrounded by a wall, the thickness of which can be guaranteed very precisely. Thus a minimum distance between the outer wall of the housing and each of the components present in the shell can be guaranteed. The minimum thickness of the shell is preferably between 0.5 and 2 mm. A shell with a disruptive voltage of 31 kV/mm between the two sides of the wall is preferably provided. Measured according to EN60355, the insulation must comply with the base insulation of 1250V.

Suitable polymers are all polymers suitable for contacting of electrical components, preferably injection-mouldable polymers such as thermoplastics and elastomers. For example, these polymers are polyamide (PA), polyester (PES), polyolefins such as polypropylene (PP), polyethylene (PE), polyethylene terephthalate (PET), polyvinylchloride (PVC) and similar or mixed polymers, in some cases supplemented with softeners, fire retardant agents, fillers and similar. More preferably, PA or PVC is used, preferably applied by injection moulding.

According to yet other embodiments, the male and/or female component may comprise a housing which is completely formed around the printed circuit board, by surround-moulding this with polymer in the form of the definitive housing. The printed circuit board and associated elements are clamped in a die, wherein the contact pins and/or contact sockets remain free in order to later allow electrical contact, and this die is filled with polymer by injection moulding. Possible polymers are those stated above. PA and PVC are preferably used. The printed circuit board accordingly sits completely embedded in the housing, with only the contact pins and/or contact sockets left free. The minimum thickness of the housing is preferably between 0.5 and 2 mm.

According to yet other embodiments, the male and/or female component may comprise a housing which partially consists of a shell and is partially formed by surround-moulding the printed circuit board with polymer in the form of the definitive housing. Possible polymers are those stated above. PA and PVC are preferably used. The minimum thickness of the housing is preferably between 0.5 and 2 mm.

According to some embodiments, the male and female components may be suitable for coupling of at least one housing, if necessary both housings, in a coupling direction, and comprises steering elements which steer the movement of the male and female components during coupling of the male and female component in the coupling direction.

The steering elements may determine the relative movement of the male and female components, so that the contact pin of the male component and the respective associated contact socket of the female component are correctly oriented to each other during coupling.

For steering elements, the male component may have protruding elements on the housing which may be inserted in an opening in the housing of the female component during coupling. Alternatively, the female component may have protruding elements on the housing which may be inserted in an opening in the housing of the male component during coupling. The protruding elements protrude from the housing in the movement direction during coupling, i.e. in the coupling direction. The openings may be conical in order to thus steer the movement.

According to some embodiments:

The male component may have one or more protrusions in the coupling direction, and the female component may have one or more recesses corresponding to the protrusions in the coupling direction; and/or The female component may have one or more protrusions in the coupling direction, and the male component may have one or more recesses corresponding to the protrusions in the coupling direction.

It must be stated that the steering elements form an integral part of the housing or housings. The steering elements may assume numerous forms, for example protruding parts of the housing of one of the components which slide over thinner zones of the other component housing. By means of e.g. protruding parts, ribs or similar which fit into grooves or similar, or conical faces meeting each other, the steering elements move, steer and assist or guide the two components correctly towards one another. The steering elements may centre the two components relative to one another. The objective here is to position the electrically coupling parts of the male and female components correctly with respect to one another before the electrical coupling begins. It is therefore important that the steering elements first make contact with and steer one another before electrical contact is made between the male and female components.

According to some embodiments, at least one of the steering elements of one of the components may make contact in the coupling direction with the corresponding steering element of the other component, before one or more contact pins of the male component can make electrical contact with the corresponding contact socket of the female component.

In other words, at least one of the steering elements of one of the components protrudes further in the coupling direction from the housing of the component than the furthest point of the contact pin or contact socket of this component. This is advantageous because steering or guiding the components for electrical coupling ensures that the insertion of the contact pins in the corresponding contact sockets takes place smoothly with minimum possible dimensional deviation, whereby the service life of the contact pins and sockets may be extended and bending of the contact pins may be reduced or even prevented.

According to some embodiments, one of the wires of the motor and one of the wires of the supply cable may be an earthing conductor.

According to some embodiments, the male and female components may be suitable for coupling in a coupling direction, and during coupling in the coupling direction, the contact pin or contact socket coupled to the earthing conductor of the supply cable makes contact with the corresponding contact socket or contact pin coupled to the earthing conductor of the motor, before one or more other contact pins of the male component can make electrical contact with the corresponding contact sockets of the female component.

Creating a connection of the earths first is often important to avoid short-circuits and similar, and to ensure the safety of the coupling.

The contact pins and sockets which are coupled to an earthing conductor may be designed more robustly than the contact pins and sockets which are coupled to current-carrying wires. They may for example be designed thicker. The contact pin which is coupled to the earth, and/or the contact socket which is coupled to the earth, may for example be designed longer and/or be placed in a position which protrudes further above the printed circuit board. In all cases, this ensures that these contact pins and sockets make contact first before the other contact pins and sockets are electrically coupled.

It is advantageous that the order in which different parts make contact during coupling of the components is the order in which firstly steering of the components is ensured, and then electrical coupling of the earthing conductors, and only then the coupling of the current-carrying conductors.

Thus according to preferred embodiments, an awning device is provided wherein one of the wires of the motor and one of the wires of the supply cable is an earthing conductor, the male and female components are suitable for coupling in a coupling direction, and during coupling in the coupling direction, the contact pin coupled to the earthing conductor of the supply cable makes contact with the corresponding contact socket coupled to the earthing conductor of the other component, before one or more other contact pins of the male component can make electrical contact with the corresponding contact sockets of the female component;

wherein the male component comprises a housing which surrounds the printed circuit board, and wherein the female component comprises a housing which surrounds the printed circuit board, and wherein at least one housing, where applicable both housings, contain steering elements which steer the movements of the male and female components during coupling of the male and female components in the coupling direction, at least one of the steering elements of one of the components makes contact in the coupling direction with the corresponding steering element of the other component, before one or more contact pins of the male component can make electrical contact with the corresponding contact socket of the female component.

According to some embodiments, the at least one contact pin may be axially surrounded by an electrically isolating wall, wherein there is no contact between the pin and this wall.

The minimum thickness of the isolating wall is preferably between 0.5 and 2 mm.

According to some embodiments, the at least one contact socket may be axially surrounded by an electrically isolating wall, wherein there is contact between the socket and this wall along the axis of the socket.

The minimum thickness of the isolating wall is preferably between 0.5 and 2 mm.

According to some embodiments, the at least one contact pin may be axially surrounded by an electrically isolating wall, wherein there is no contact between the pin and this wall, and wherein the at least one contact socket may be axially surrounded by an electrically isolating wall, wherein there is contact between the socket and this socket wall along the axis of the socket, and wherein the socket wall fits between the contact pin and the wall surrounding the contact pin.

The electrically isolating wall and socket wall may be made of the same material as the shell of the housing and preferably form part of the component housing, for example part of the shell of the component housing. PA and PVC are preferred.

The material of the wall and/or socket wall is electrically isolating if a disruptive voltage of at least 600 V/mm is obtained, preferably more than 10 kV/mm, such as more than 30 kV/mm.

The minimum thickness of the wall and/or the socket wall preferably lies in the range from 0.5 to 2 mm. Preferably, the wall protrudes in the axial direction along the contact pin slightly further past the contact pin in the axial direction. Also preferably, the socket wall protrudes in the axial direction along the contact socket slightly further past the contact socket in the axial direction.

During coupling of the male and female components, these walls also partly function as steering elements on the male and female components.

The perimeter of a radial section of these walls need not be identical to the shape of a radial section of the contact pin or socket. The perimeter of a radial section of these walls may be circular, elliptical, rectangular, square or similar.

According to some embodiments, a sealing ring may be provided for making a watertight contact between the wall around the contact pin and the socket wall.

According to some embodiments, this sealing ring may be provided at the foot of the wall around the contact pin. One sealing ring surrounding this foot may be sufficient.

According to some embodiments, this sealing ring may be provided at the top of the socket wall. One sealing ring which lies on this top, perhaps where the top is provided with a holder for holding the ring, may be sufficient.

According to some embodiments, the supply cable may comprise M1 wires, the male or female component comprises N1 contact pins or contact sockets, wherein N1>=M1 and M1>=2.

According to some embodiments, the motor may comprise M2 wires, the male or female component comprises N2 contact pins or contact sockets, wherein N2>=M2 and M2>=2.

According to some embodiments, it is possible that M1=M2 and N1>M1 or N2>M2.

In one embodiment, M1=M2>=3 and N1 and N2 are both greater than 3, for example M1=M2=N1=N2=4.

In some embodiments, the male or the female component coupled to the supply cable is configured such that it is compatible with a female or male component coupled to the motor, which is mounted on the left or right with respect to the rotating awning. Awning devices are often designed in two versions, wherein the motor may be positioned either on the left side of the rolled up awning or on the right side. On use of the same motor, the contact pins or sockets, depending on whether the male or female connector is coupled to the motor, may be positioned in a mirror image depending on a left-hand or right-hand installation. To offer both situations the possibility of using the same component (male or female) on the supply cable, the contact pins and sockets must be configured symmetrically on the component which is coupled to the supply cable. Thus for example, in the case of M wires in the supply cable, a single wire may be electrically coupled to two contact pins or sockets which are both integrated as a mirror image of one another in the same male or female component.

In other embodiments, the contact pin and socket coupled to the earthing conductor are arranged centrally, and hence need not be duplicated, while the other contact pins or sockets which conduct current are duplicated and arranged symmetrically.

The contact pins and sockets are not limited in size, although the length of the pins and the depth of the sockets lies preferably between 8 and 15 mm. The area of the cross-section of the contact pins, and hence the area of the cross-section of the contact sockets, preferably lies between 2.4 $mm^2$ and $5mm^2$. For contact pins and sockets with circular cross-section, this means that the diameter of the cross-section preferably varies between 1 and 2 mm inclusive. Preferably, but not necessarily, the pins and sockets are cylindrical in cross-section. The cross-section may also for example be rectangular, polygonal or elliptical. Despite the relatively small dimensions, the pins and sockets should be strong since they are subjected to relatively high forces during mounting of the canvas packet.

The contact pins and sockets are also electrically conductive, and preferably made of copper or copper alloys, in some cases with a hard gold coating, which is a coating of a few tens of microns, for example 50 μm, of gold on a nickel buffer layer applied to the copper.

According to some embodiments, the wires may be coupled to the printed conductors by griplets. The griplets may for example be made of copper, in some cases with a nickel or nickel-tin coating.

In alternative embodiments, the wires may also be soldered to the printed conductors, crimp contacts may be used, or the wires may be coupled to the printed conductors using any known technique.

The griplets or other connection pieces used are preferably embedded in the polymer volume containing the printed circuit board.

According to some embodiments, the male component may be coupled to the wires of the supply cable, and the female component coupled to the wires of the motor.

According to some embodiments, the female component may be coupled to the wires of the supply cable, and the male component coupled to the wires of the motor.

According to a second aspect, a method is provided for mounting an awning installation according to the first aspect of the invention. The method for mounting an awning installation according to the first aspect of the invention comprises providing this awning installation according to the first aspect of the invention, which awning installation comprises a device housing. The method comprises inserting the motor and the roll-up awning in the device housing, wherein during this insertion, the coupling of the male and female components of the coupling is achieved.

The motor and the roll-up awning (together known as the canvas packet) may be inserted from the front into the device housing, which in some cases is itself mounted on the wall where the awning installation is to be attached. The component attached to the supply cable may already be present in the housing, supported by a mounting piece of the housing. Therefore during insertion of the canvas packet, at the same time the coupling of the male and female component is achieved. After insertion and hence coupling of the supply cable to the motor, the housing is closed with a closing piece.

According to a third aspect, a method is provided for manufacturing an awning device. The method for manufacturing an awning device according to the first aspect of the invention comprises steps A and/or B, steps A being:

A1: providing a printed circuit board (PCB) on which at least one contact pin is electrically coupled to at least one printed conductor on the printed circuit board, which at least one printed conductor is electrically coupled to at least one wire of a first of the motor and the supply cable;

A2: introducing the printed circuit board into a first shell;

A3: filling the shell containing the printed circuit board with a polymer;

A4: optionally closing the shell with a closing piece;

steps B being:

B1: providing a printed circuit board (PCB) on which at least one contact socket is electrically coupled to at least one printed conductor on the printed circuit board, which at least one printed conductor is electrically coupled to at least one wire of the other of the motor and the supply cable;

B2: introducing the printed circuit board into a first shell;

B3: filling the shell containing the printed circuit board with a polymer;

B4: optionally closing the shell with a closing piece.

According to some embodiments, steps A and B may be performed.

The shells may be made of one piece, for example a shell which can be closed around a volume, which volume may contain the printed circuit board, and in which shell openings are provided for the contact pins or sockets. Or the shell may consist of at least one part surrounding a volume and a closing piece for closing the shell. Or the shell may consist of several parts which together may enclose a volume. Preferably, the shells or parts of the shell are injection mouldings.

The printed circuit board may be held in place by aids during introduction of the polymer, or the shell may have support and/or clamping faces in which the printed circuit board is clamped or on which it rests.

The shell may also comprise an entrance for the wires or the entire supply cable, through which the wires gain access to the printed circuit board in the volume.

The shell provided with the printed circuit board may be filled with a polymer by injection moulding.

According to a fourth aspect, an awning installation is also provided. An awning device may be obtained with a method according to the third aspect of the invention.

This awning device comprises a roll-up awning, an electric motor for rotating the roll-up awning, which motor is electrically supplied by one or more wires, a supply cable comprising one or more wires, an electrical coupling for coupling the wires of the supply cable to the wires of the motor, which coupling comprises a male and female component which can be coupled together electrically and mechanically, characterized in that the male component comprises a printed circuit board (PCB) on which at least one electrical connector is electrically coupled to at least one printed conductor on the printed circuit board, which at least one printed conductor is electrically coupled to at least one wire of a first of the motor and supply cable, which male component comprises a housing enclosing the printed circuit board and provides at least one couplable electrical connector; and/or the female component comprises a printed circuit board (PCB) on which at least one electrical connector is electrically coupled to at least one printed conductor on the printed circuit board, which at least one printed conductor is electrically coupled to at least one wire of the other of the motor and supply cable, which female component comprises a housing enclosing the printed circuit board and provides at least one couplable electrical connector.

According to some embodiments, the male component comprises a printed circuit board (PCB) on which at least one electrical connector is electrically coupled to at least one printed conductor on the printed circuit board, which at least one printed conductor is electrically coupled to at least one wire of a first of the motor and supply cable, which male component comprises a housing enclosing the printed circuit board and provides at least one couplable electrical connector; and the female component comprises a printed circuit board (PCB) on which at least one electrical connector is electrically coupled to at least one printed conductor on the printed circuit board, which at least one printed conductor is electrically coupled to at least one wire of the other of the motor and supply cable, which female component comprises a housing enclosing the printed circuit board and provides at least one couplable electrical connector.

According to some embodiments, the printed circuit board of the male and/or female component in the shell may be enclosed by a polymer volume which fills the shell.

According to some embodiments, the at least one electrical connector of the male component may be a contact pin.

According to some embodiments, the at least one electrical connector of the female component may be a contact socket.

Features and/or elements of embodiments of one aspect of the invention may be combined with features and/or elements of the other aspects insofar as they are not technically incompatible.

The independent and dependent claims indicate specific and preferred features of the embodiments of the invention. Features of the dependent claims may be combined with features of the independent and dependent claims, or with features as described above and/or below, in any suitable manner which is evident to a person skilled in the art.

The above-mentioned and other features, properties and advantages of the present invention will be explained with reference to the following exemplary embodiments, in some cases in combination with the drawings.

The description of these exemplary embodiments is given as clarification, without the intention of restricting the scope of the invention. The reference symbols in the description below refer to the drawings. The same reference symbols in different figures refer to identical or equivalent elements.

BRIEF DESCRIPTION OF THE DRAWINGS

With a view to giving a more detailed description of the features of the invention, several preferred embodiments are described below by way of non-limiting example with reference to the attached drawings, in which.

DESCRIPTION OF EMBODIMENTS

The present invention is described below with reference to specific embodiments.

It is clear that although the embodiments and/or materials for obtaining embodiments according to the invention are discussed, various modifications or amendments may be made without deviating from the functional scope and/or spirit of this invention. The present invention is by no means limited to the above-described embodiments, but may be realised according to different variants without departing from the scope of the present invention.

Figure 1:
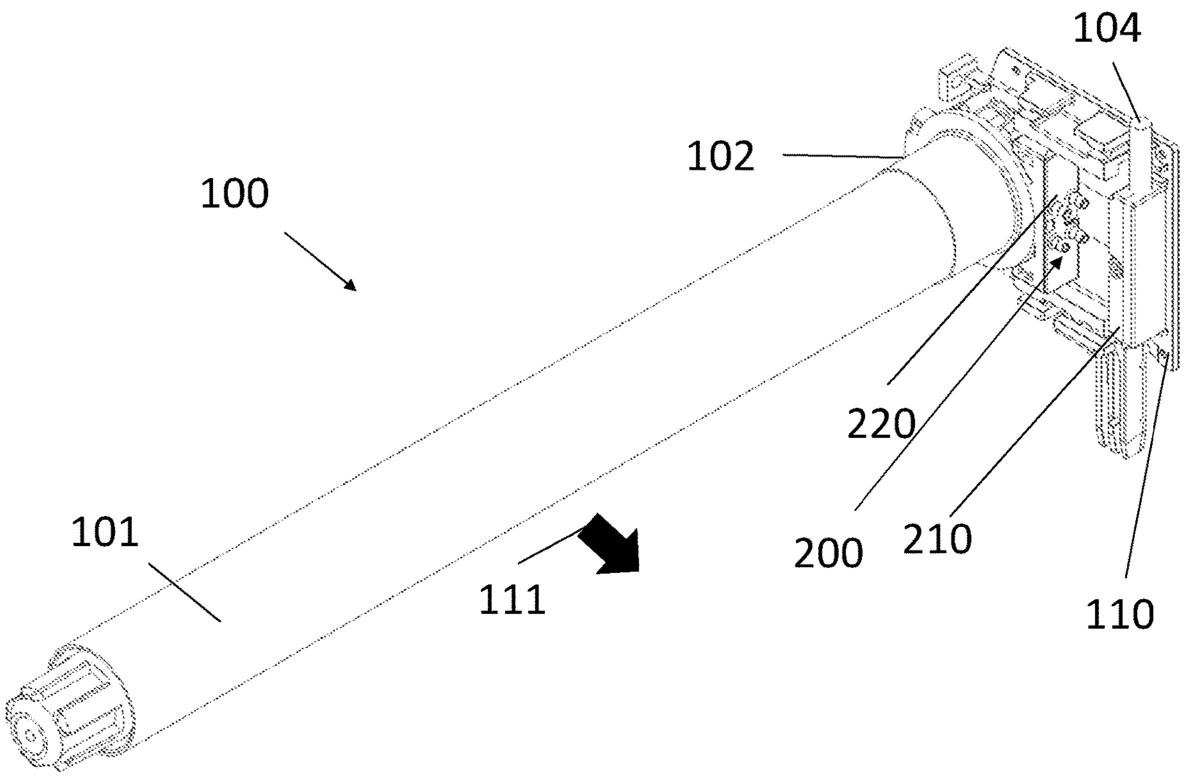
FIG. 1 illustrates schematically an awning device according to the invention.

An awning device 100 according to the invention is shown in FIG. 1 and comprises a roll-up awning 101 and an electric motor 102 for rotating the roll-up awning. The motor 102 is electrically powered by four wires 103, one of which is the earthing conductor. The awning device 100 furthermore comprises a supply cable 104 comprising four wires 105, one of which is the earthing conductor. For coupling the wires 105 of the supply cable 104 to the wires 103 of the motor 102, an electrical coupling 200 comprising a male 210 and a female 220 component is provided, the two of which may be coupled together electrically and mechanically. In this embodiment, the male connector 210 is already connected to a mounting piece 110, which in turn is already attached in the housing of the awning device before the canvas packet comprising the roll-up awning 101 and the electric motor 102 is inserted in the direction indicated with numeral 111.

Figure 2:
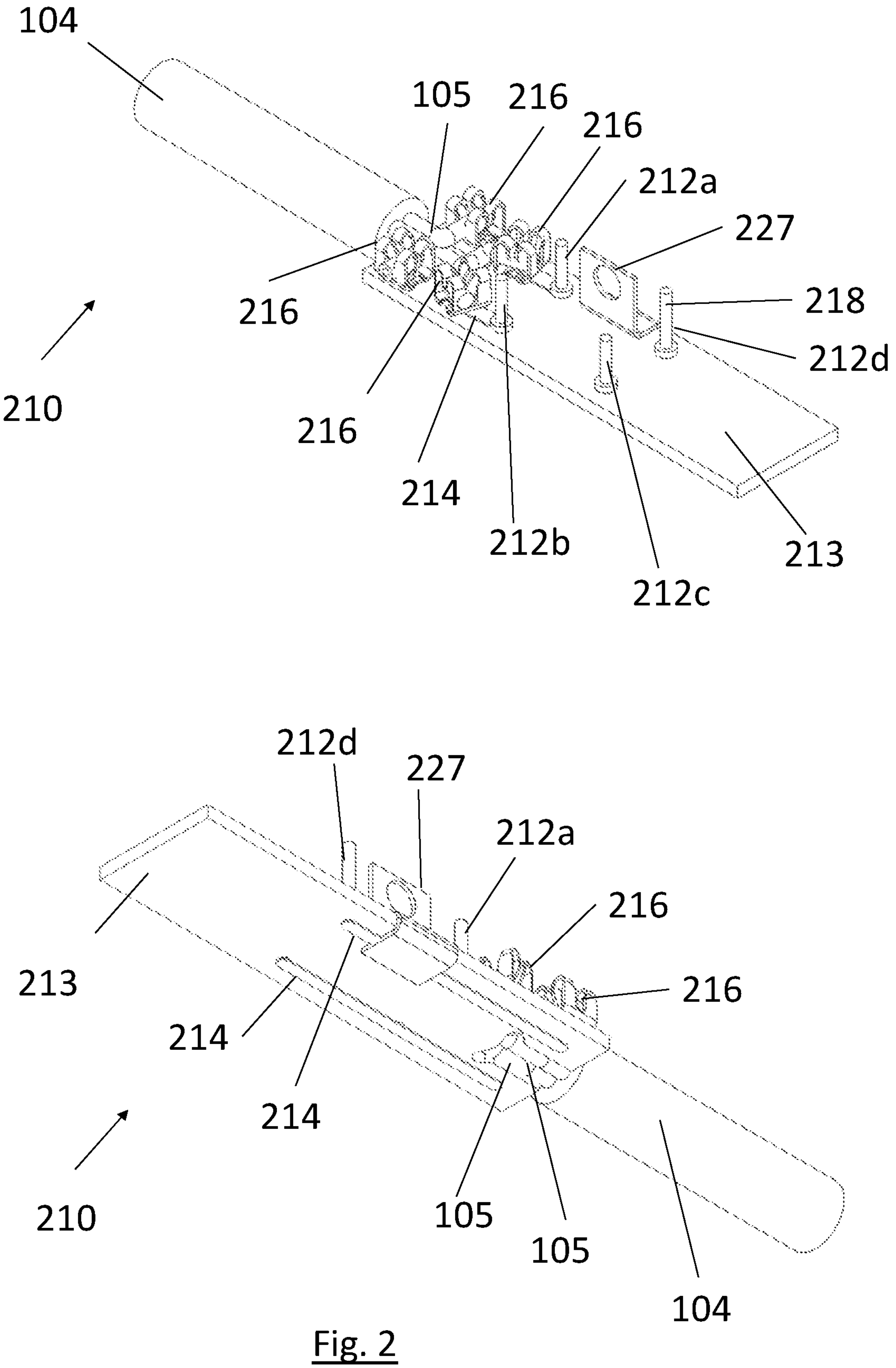
FIGS. 2 and 3 indicate schematically parts of a male and female component respectively, which form part of an awning device according to the invention.

A top and bottom view of a part of the male component 210 are shown in FIG. 2. The male component comprises a printed circuit board 213 (PCB) on which electrical connectors, being contact pins 212*a* to 212*d*, are electrically coupled to printed conductors 214 on the printed circuit board 213. These printed conductors are electrically coupled to wires of the supply cable 104. This is achieved using copper griplets 216 coated with nickel. The male component 210 in this embodiment comprises four contact pins 212*a* to 212*d*. Contact pin 212*a* is coupled to the wire conducting the neutral, contact pins 212*b* and 212*c* are each coupled to a wire carrying an alternating current phase. The contact pin 212*d* is the contact pin 218 coupled to the earthing and is slightly longer than the other contact pins. In the centre, the male component has an earthing fin 227 which serves to earth the housing.

Figure 3:
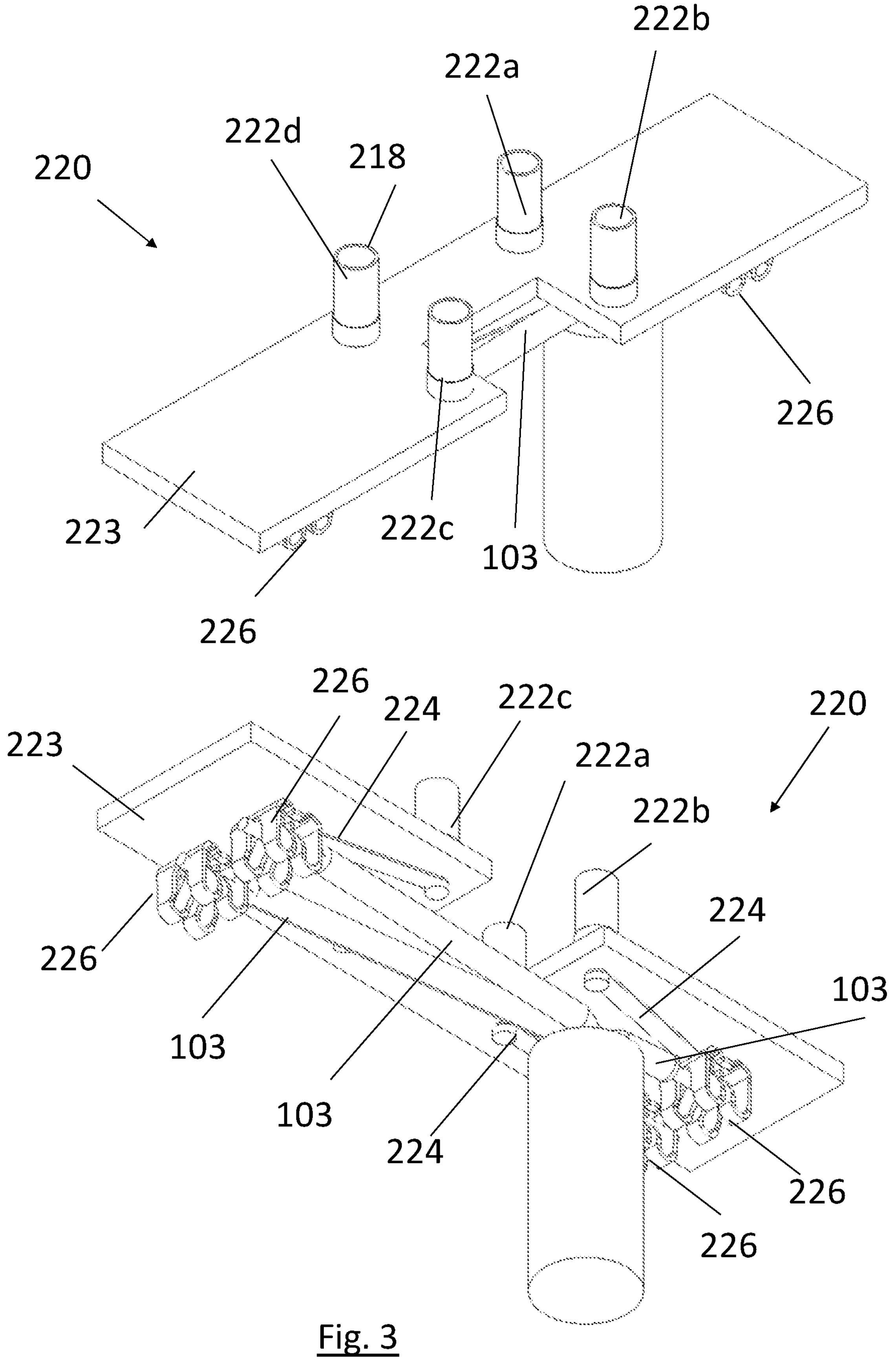

The female component 220 in FIG. 3 comprises a printed circuit board 223 (PCB) on which electrical connectors, being contact sockets 222*a* to 222*d*, are electrically coupled to printed conductors 224 on the printed circuit board 223. The printed conductors are electrically coupled to the wires 103 of the motor 102. This is achieved using griplets 226 identical to the griplets 216. The female component 220 comprises four contact sockets 222*a* to 222*d*. The contact socket 222*d* is the contact socket 228 coupled to the earthing and is slightly longer than the other contact sockets. Contact socket 222*a* is coupled to the wire conducting the neutral, contact sockets 222*b* and 222*c* are each coupled to a wire carrying an alternating current phase.

The printed circuit boards 213 and 223 have a length of around 35 to 58 mm and a width of around 12 to 15 mm, are 1.6 mm thick and are made of glass fibre-fabric reinforced epoxy The conductors 214 and 224 preferably have a surface area weight of 1 to 2 ounces per square foot and are made of copper, in some cases with a hard gold coating. The conductors coupled to the earthing wires preferably have a surface area weight of 2 ounces per square foot. The cross-sectional area of the conductor is preferably 0.106 $mm^2$ or more for a surface area weight of 2 ounces per square foot.

The contact pins are made of copper, preferably with a hard gold coating, and have a length of around 0.22 inch, except for that coupled to the earthing conductor which has a length of 0.28 inch. The diameter of the contact pins is 0.05 inch. The contact sockets are made of copper, preferably with a hard gold coating, and have a length of 0.25 inch and an opening diameter suitable for receiving 0.05 inch pins.

Because the contact pin connected to the earthing and the contact socket connected to the earthing are longer, on coupling of components 210 to 220, this contact pin and socket make contact first before the three other contact pins and sockets make contact.

Figure 4:
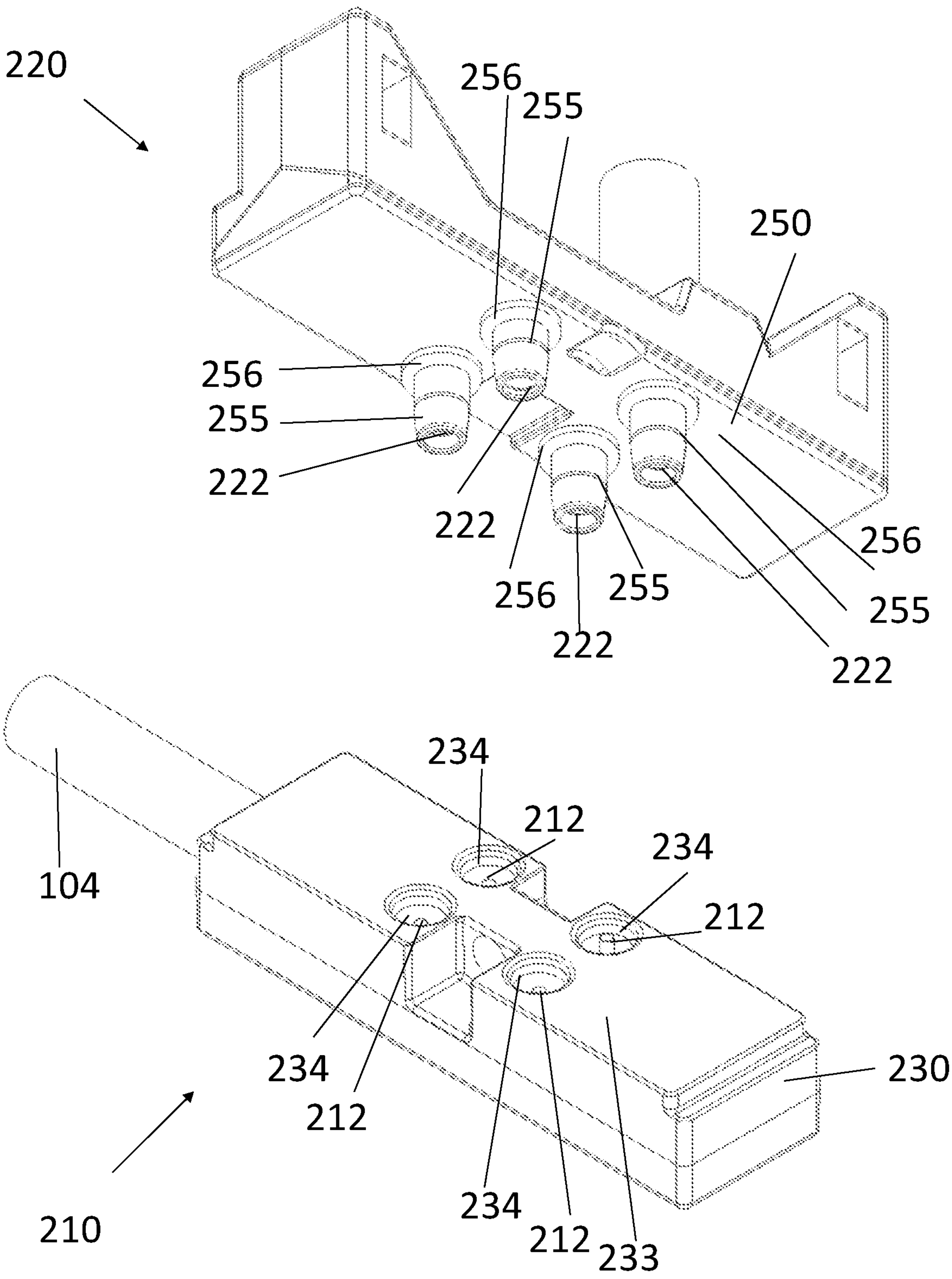
FIG. 4 indicates schematically a male and female component which form part of an awning device according to the invention.

The male and female components 210 and 220 together with their housings are shown in FIG. 4.

The printed circuit boards are completely enclosed by the respective housing 230 or 250.

In the housing 230, the four contact pins are axially surrounded by an electrically isolating wall 233, wherein no contact is made between the contact pins 212 and this wall 223. The contact pins 212 do not protrude outside the wall 233 in the axial direction, and an open zone 234 remains between the wall 233 and the contact pin 212. As well as protecting the contact pins, this wall 233 and open zone 234, defining a recess, have a second function, namely as steering elements for providing secondary guidance of the coupling movement.

The contact sockets 222 of the female component 220 are axially surrounded by an electrically isolating socket wall 255, wherein contact is made along the entire socket wall 255 in the axial direction. The socket wall 255 at the top is level with or, as shown in this embodiment, protrudes slightly above the contact socket 222 and functions as a steering element in the form of a protrusion. The socket wall 255 fits between the contact pin 212 and the wall 233 which surrounds the contact pin. It fits and thus slides into the open zone 234. The socket wall 255 has a steering or guiding function during coupling of the male and female components. The socket wall is slightly conical, and if the socket wall 255 and open zone 234 do not precisely lie opposite one another during coupling, the conical wall of the socket wall 255 will steer the incoming sockets 222 into the correct position.

At the bottom of each contact socket 222, around the socket wall 255 surrounding this contact socket, a sealing ring 256 is provided for a watertight seal of the coupled contact pin and socket. This ring 256 also fits into a small recess 235 which is provided in the wall 233 at the top.

In another embodiment (not shown), the female component has two guide pins which, during coupling with the male component, slide into two openings of the housing of the male component. These pins and openings are, amongst others, steering elements which steer the movement of the male and female component during coupling of the male and female component in the coupling direction.

The housing of the female component may also comprise a stiffening zone which increases the stiffness of the entire housing.

Figure 5A:
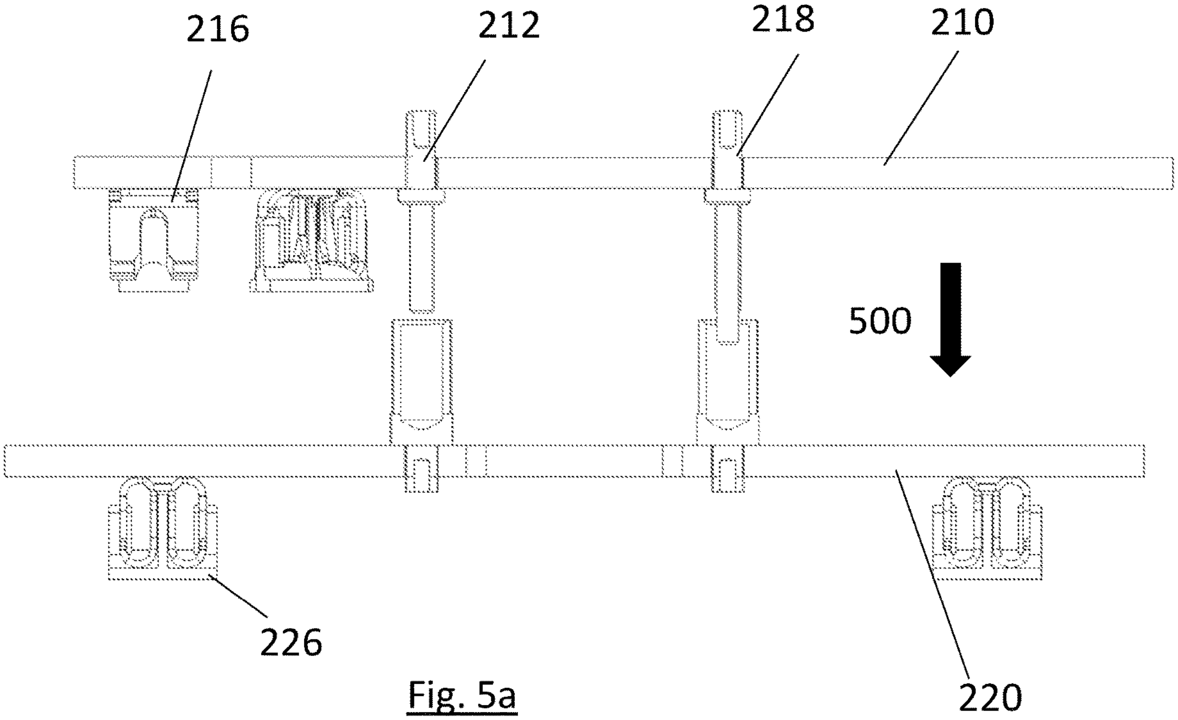
FIGS. 5*a* and 5*b* indicate schematically how, according to some embodiments of the invention, the earthing conductors make electrical contact first during coupling of the male and female components.
Figure 5B:
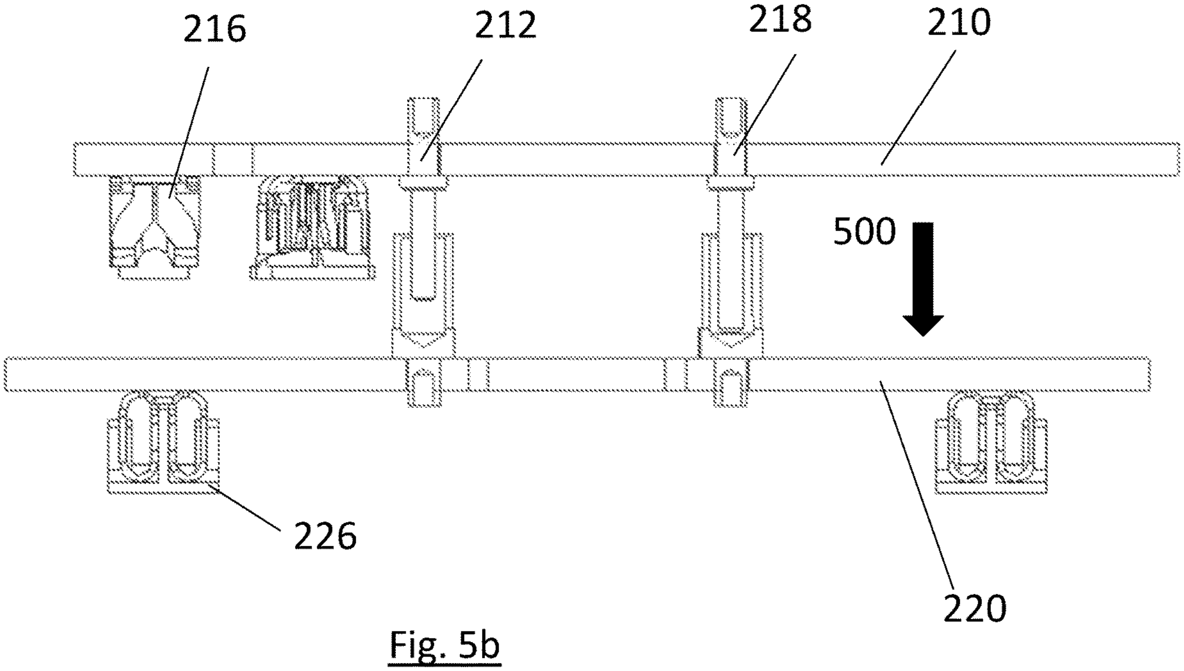

A detail of the coupling between a male and female component 210 and 220 is shown in FIGS. 5*a* and 5*b*. In detail, a contact pin 218 is shown which is electrically coupled to the earthing, and a contact pin 212 (being contact pin 212*a*, 212*b* or 212*c*) which is electrically coupled to a current-conducting or current-carrying wire or the neutral. During coupling of a male and female component 210 and 220 in the coupling direction 500, contact pin 218 will first make contact with the corresponding contact socket 222. This is shown in FIG. 5*a*. Only then, as shown in FIG. 5*b*, will the other contact pins 212 make contact with their corresponding contact sockets 222.

Figure 6:
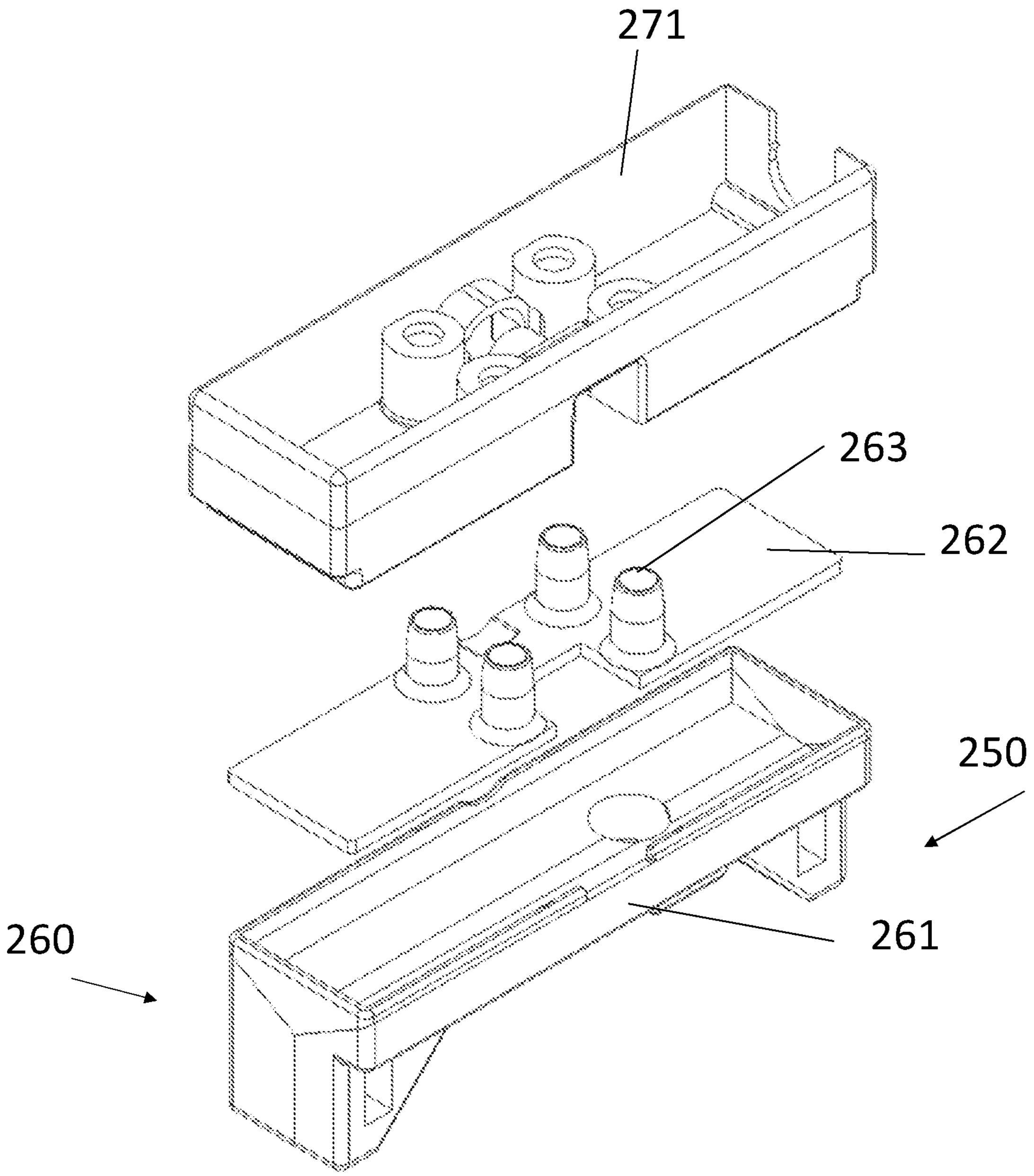
FIG. 6 indicates schematically parts of the housing of a female component which forms part of an awning device according to the invention.

FIG. 6 shows in detail how the housing of the female component 220 is produced. A shell 260 consisting of carrier piece 261 and a cover or closing piece 262 is provided.

The shell is made of PA or PVC and has a minimum wall thickness of 0.5 to 2 mm.

The printed circuit board, which is connected to the supply cable and provided with the contact sockets, is positioned in the carrier piece 261. The open volume above and below the printed circuit board in the carrier piece 261 is filled with a polymer volume, which polymer is preferably PA or PVC. This polymer is melted during casting. After filling with polymer, the closing piece 262 is mounted, wherein the contact sockets are guided into the upright parts 263, and the polymer volume can cool and harden.

The male component 210, of which FIG. 6 shows the carrier piece 271, is produced similarly.

Figure 7:
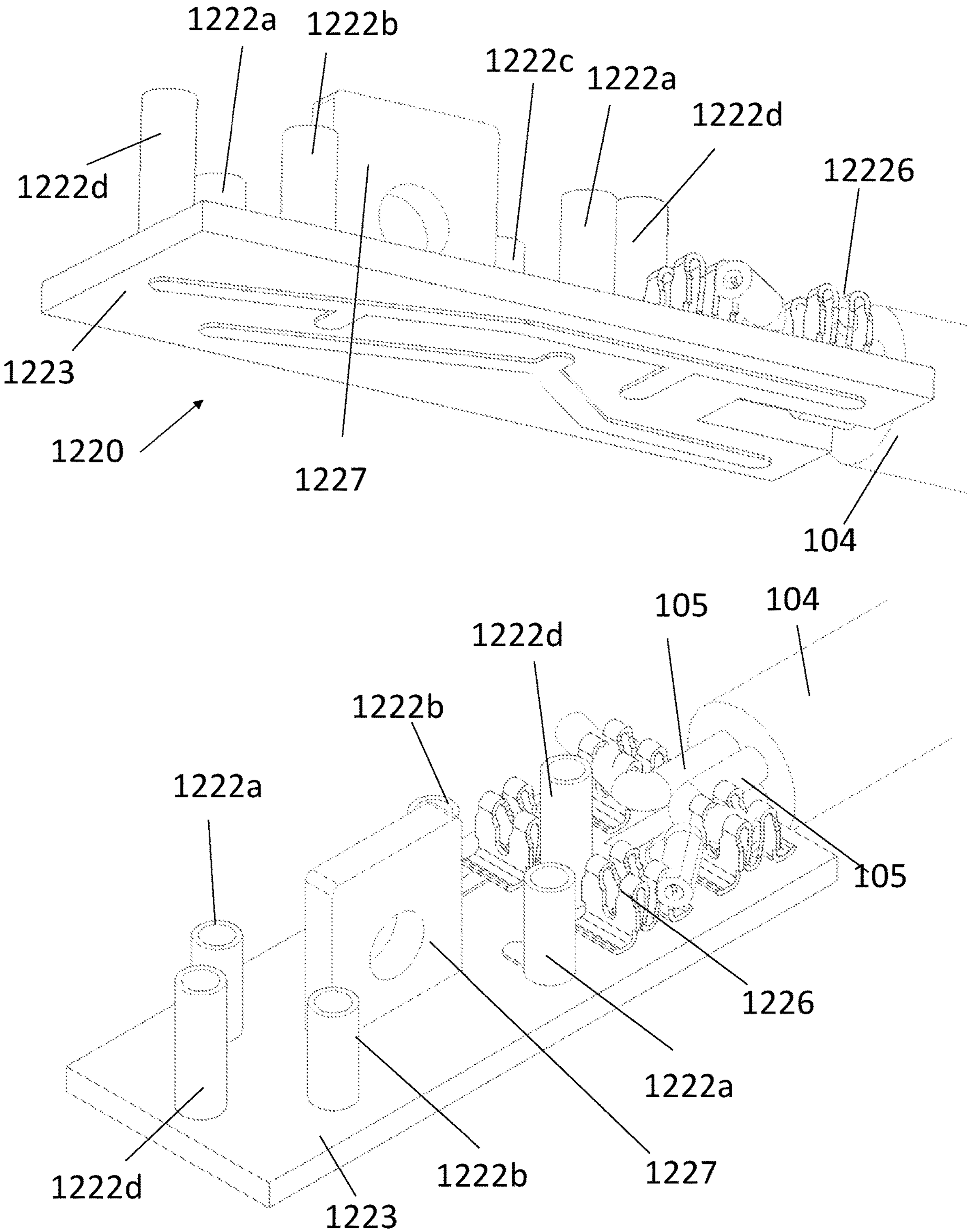
FIG. 7 indicates schematically a female component which forms part of an awning device according to the invention, which is configured symmetrically.

FIG. 7 shows an alternative component which is suitable for mounting in an awning device which can be mounted on both the left and right.

In this embodiment, the female component 1220 is coupled to the wires of the supply cable 104, again with griplets 1226, and this female component has an earthing fin 1227. Six contact sockets 1222 are connected on the PCB 1223. The contact sockets 1222*d* are coupled to the earthing wires. The two contact sockets 1222*a* are connected to the neutral wire of the supply cable. On connection on both left and right to the male component which only comprises four pins, in both cases the earthing pin and neutral pin are connected to the earthing socket 1222*d* and the neutral socket 1222*a,* by making contact with one of the two sockets 1222*a* or 1222*d.* The two remaining contact sockets 1222*b* and 1222*c* are each electrically coupled to one of the current-carrying wires of the supply cable. In both mounting options, either left or right, one of the current-carrying contact sockets makes contact with one contact pin and can thus transmit current.

Although the present invention has been illustrated by means of specific embodiments, it will be clear to the person skilled in the art that the invention is not limited to the details of the above illustrative embodiments, and that the present invention may be carried out with various changes and modifications without thereby departing from the area of application of the invention. Therefore, the present embodiments have to be seen in all respects as being illustrative and non-restrictive, and the area of application of the invention is described by the attached claims and not by the above description, and therefore any changes which fall within the meaning and scope of the claims are therefore incorporated herein. In other words, it is assumed that this covers all changes, variations or equivalents which fall within the area of application of the underlying basic principles and the essential attributes of which are claimed in this patent application. In addition, the reader of this patent application will understand that the terms "comprising" or "comprise" do not exclude other elements or steps, that the term "a(n)" does not exclude the plural and that a single element, such as a computer system, a processor or another integrated unit, can perform the functions of various auxiliary means which are mentioned in the claims. Any references in the claims cannot be interpreted as a limitation of the respective claims. The terms "first", "second", "third", "a", "b", "c" and the like, when used in the description or in the claims, are used to distinguish between similar elements or steps and do not necessarily indicate a sequential or chronological order. In the same way, the terms "top side", "bottom side", "above", "below" and the like are used for the sake of the description and do not necessarily refer to relative positions. It should be understood that these terms are interchangeable under the appropriate circumstances and that embodiments of the invention can function according to the present invention in different sequences or orientations than those described or illustrated above.

The invention claimed is:

1. An awning device comprising a roll-up awning, an electric motor for rotating the roll-up awning, which motor is electrically supplied by one or more wires, a supply cable comprising one or more wires, an electrical coupling for coupling the wires of the supply cable to the wires of the motor, which coupling comprises a male and female component which can be coupled together electrically and mechanically, wherein the male component comprises at least one contact pin and the female component comprises at least one contact socket, wherein the male component comprises a first printed circuit board (PCB) on which the least one contact pin is electrically coupled to at least one printed conductor on the first printed circuit board, which at least one printed conductor is electrically coupled to at least one wire of a first of the motor and supply cable, wherein the female component comprises a second printed circuit board (PCB) on which the at least one contact socket is electrically coupled to at least one printed conductor on the second printed circuit board, which at least one printed conductor is electrically coupled to at least one wire of the other of the motor and the supply cable, wherein the male component comprises a housing which encloses the first printed circuit board, wherein the female component comprises a housing which encloses the second printed circuit board, wherein the male and female components are suitable for coupling of both housings, in a coupling direction, and comprise steering elements which steer the movement of the male and female components during coupling of the male and female components in the coupling direction.

2. The awning device according to claim 1, wherein each of the housings comprises a shell which partially or fully surrounds the first or second printed circuit board, respectively, wherein the printed circuit board in the shell is enclosed by a polymer volume which fills the shell.

3. The awning device according to claim 1, wherein the steering elements of the male component comprise one or more protrusions in the coupling direction, and the steering elements of the female component comprise one or more recesses corresponding to the protrusions in the coupling direction; and/or the steering elements of the female component comprise one or more protrusions in the coupling direction, and the steering elements of the male component comprise one or more recesses corresponding to the protrusions in the coupling direction.

4. The awning device according to claim 1, wherein at least one of the steering elements of one of the components makes contact in the coupling direction with the corresponding steering element of the other component, before one or more contact pins of the male component can make electrical contact with the corresponding contact socket of the female component.

5. The awning device according to claim 1, wherein one of the wires of the motor and one of the wires of the supply cable is an earthing conductor.

6. The awning device according to claim 5, wherein the male and female components are suitable for coupling in a coupling direction, and during coupling in the coupling direction, the contact pin or contact socket coupled to the earthing conductor of the supply cable makes contact with the corresponding contact socket or contact pin coupled to the earthing conductor of the motor, before one or more other contact pins of the male component can make electrical contact with the corresponding contact sockets of the female component.

7. The awning device according to claim 1, wherein the at least one contact pin is axially surrounded by an electrically isolating wall, wherein there is no contact between the pin and this wall.

8. The awning device according to claim 1, wherein the at least one contact socket is axially surrounded by an electrically isolating wall, wherein there is contact between the socket and this wall along the axis of the socket.

9. The awning device according to claim 1, wherein the at least one contact pin is axially surrounded by an electrically isolating wall, wherein there is no contact between the pin and this wall, and wherein the at least one contact socket is axially surrounded by an electrically isolating socket wall, wherein there is contact between the socket and this socket wall along the axis of the socket, and wherein the socket wall fits between the contact pin and the wall surrounding the contact pin.

10. The awning device according to claim 9, wherein a sealing ring is provided for making a watertight contact between the wall around the contact pin and the socket wall.

11. The awning device according to claim 1, wherein the supply cable comprises M1 wires, the male or female component comprises N1 contact pins or contact sockets, wherein N1>=M1 and M1>=2.

12. The awning device according to claim 11, wherein the motor comprises M2 wires, the male or female component comprises N2 contact pins or contact sockets, wherein N2>=M2 and M2>=2.

13. The awning device according to claim 12, wherein M1=M2 and N1>M1 or N2>M2.

14. The awning device according to claim 1, wherein the at least one contact pin is axially surrounded by an electrically isolating wall, wherein there is no contact between the pin and this wall.

15. The awning device according to claim 14, wherein the at least one contact socket is axially surrounded by an electrically isolating wall, wherein there is contact between the socket and this wall along the axis of the socket.

16. The awning device according to claim 1, wherein the at least one contact pin is axially surrounded by an electrically isolating wall, wherein there is no contact between the pin and this wall, and wherein the at least one contact socket is axially surrounded by an electrically isolating socket wall, wherein there is contact between the socket and this socket wall along the axis of the socket, and wherein the socket wall fits between the contact pin and the wall surrounding the contact pin.

17. The awning device according to claim 1, wherein the steering elements comprise socket walls on the housing of the female component.

18. The awning device according to claim 17, wherein the socket walls are conical.

19. The awning device according to claim 1, wherein the steering elements comprise open spaces on the housing of the male component in which open space the contact pin is present.

* * * * *